(12) United States Patent
Kozitsky et al.

(10) Patent No.: US 9,911,055 B2
(45) Date of Patent: Mar. 6, 2018

(54) METHOD AND SYSTEM FOR DETECTION AND CLASSIFICATION OF LICENSE PLATES

(71) Applicant: Xerox Corporation, Norwalk, CT (US)

(72) Inventors: Vladimir Kozitsky, Rochester, NY (US); Matthew Shreve, Tampa, FL (US); Orhan Bulan, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 109 days.

(21) Appl. No.: 15/064,167

(22) Filed: Mar. 8, 2016

(65) Prior Publication Data
US 2017/0262723 A1   Sep. 14, 2017

(51) Int. Cl.
G06K 9/32 (2006.01)
G06K 9/62 (2006.01)

(52) U.S. Cl.
CPC .......... *G06K 9/325* (2013.01); *G06K 9/3216* (2013.01); *G06K 9/6267* (2013.01); *G06K 2209/15* (2013.01)

(58) Field of Classification Search
CPC .... G06K 9/325; G06K 9/3216; G06K 9/6267; G06K 2209/15
See application file for complete search history.

(56) References Cited

U.S. PATENT DOCUMENTS

| | | | |
|---|---|---|---|
| 6,553,131 B1 * | 4/2003 | Neubauer | G06K 9/32 382/105 |
| 7,734,097 B1 * | 6/2010 | Porikli | G06K 9/522 382/156 |
| 8,792,682 B2 | 7/2014 | Fan et al. | |
| 9,082,038 B2 | 7/2015 | Kozitsky et al. | |
| 9,111,169 B2 | 8/2015 | Challa | |
| 9,213,910 B2 | 12/2015 | Burry et al. | |
| 9,224,058 B2 | 12/2015 | Paul et al. | |
| 9,239,955 B2 | 1/2016 | Bhanu et al. | |
| 2008/0069400 A1 * | 3/2008 | Zhu | G06K 9/3241 382/103 |
| 2008/0285804 A1 | 11/2008 | Sefton | |
| 2009/0245573 A1 * | 10/2009 | Saptharishi | G06K 9/00771 382/103 |

(Continued)

OTHER PUBLICATIONS

Krizhevsky, A. et al., "ImageNet Classification with Deep Convolutional Neural Networks," Neural Information Processing Systems (2012) Lake Tahoe, Nevada, 9 pages.

(Continued)

*Primary Examiner* — Jon Chang
(74) *Attorney, Agent, or Firm* — Kermit D. Lopez; Luis M. Ortiz; OL Patents (57) ABSTRACT

Methods, systems, and processor-readable media for the detection and classification of license plates. In an example embodiment, an image of a vehicle can be captured with an image-capturing unit. A license plate region can then be located in the captured image of the vehicle by extracting a set of candidate regions from the image utilizing a weak classifier. A set of candidate regions can be ranked utilizing a secondary strong classifier. The captured image can then be classified according to a confidence driven classification based on classification criteria determined by the weak classifier and the secondary strong classifier.

20 Claims, 10 Drawing Sheets

(56) References Cited

U.S. PATENT DOCUMENTS

| | | | |
|---|---|---|---|
| 2012/0148105 A1 | 6/2012 | Burry et al. | |
| 2013/0182910 A1 | 7/2013 | Burry et al. | |
| 2013/0272579 A1 | 10/2013 | Burry et al. | |
| 2013/0289756 A1* | 10/2013 | Resch | G10H 1/0008 700/94 |
| 2014/0307924 A1 | 10/2014 | Fillion et al. | |
| 2014/0348391 A1 | 11/2014 | Schweid et al. | |
| 2014/0363052 A1 | 12/2014 | Kozitsky et al. | |
| 2015/0110358 A1* | 4/2015 | Han | G06K 9/3258 382/105 |
| 2015/0125041 A1 | 5/2015 | Burry et al. | |
| 2015/0294172 A1 | 10/2015 | Bala et al. | |
| 2015/0363670 A1* | 12/2015 | Sugishita | H04N 7/181 382/155 |
| 2016/0012602 A1 | 1/2016 | Xu et al. | |
| 2016/0019459 A1 | 1/2016 | Audhkhasi et al. | |
| 2016/0035037 A1 | 2/2016 | Bulan et al. | |
| 2016/0035078 A1 | 2/2016 | Lin et al. | |
| 2016/0070986 A1* | 3/2016 | Chidlovskii | G06K 9/00785 382/104 |

OTHER PUBLICATIONS

Du, S. et al., "Automatic License Plate Recognition (ALPR): A State-of-the-Art Review," IEEE Transactions on Circuits and Systems for Video Technology (2013) 23(2):311-325.

Girshick, R. et al., "Rich feature hierarchies for accurate object detection and semantic segmentation," IEEE Conference on Computer Vision and Pattern Recognition (2014) pp. 580-587.

U.S. Appl. No. 14/699,289, filed Apr. 29, 2015, Ramesh et al.

* cited by examiner

METHOD AND SYSTEM FOR DETECTION AND CLASSIFICATION OF LICENSE PLATES

TECHNICAL FIELD

Embodiments are generally related to the field of image-processing and video-based detection. Embodiments are also related to the field of license plate recognition. Embodiments also relate to the detection and classification of images and objects and items within such images.

BACKGROUND

Automated license plate recognition (ALPR) is a key enabler for several transportation applications. Though being a mature technology, the challenge with ALPR systems is scalability and minimizing human intervention in the existence of challenging noise sources present in license plate images captured under realistic conditions (i.e., field deployed solutions). These include: heavy shadows, non-uniform illumination, challenging optical geometries, partial occlusion, varying contrast, and general imaging noise. These challenging imaging conditions make it difficult to locate the license plate. Given these potential challenges, a number of captured license plate images cannot be recognized by a human, which in turn leads to a waste of review effort and increased cost.

Figure 1:
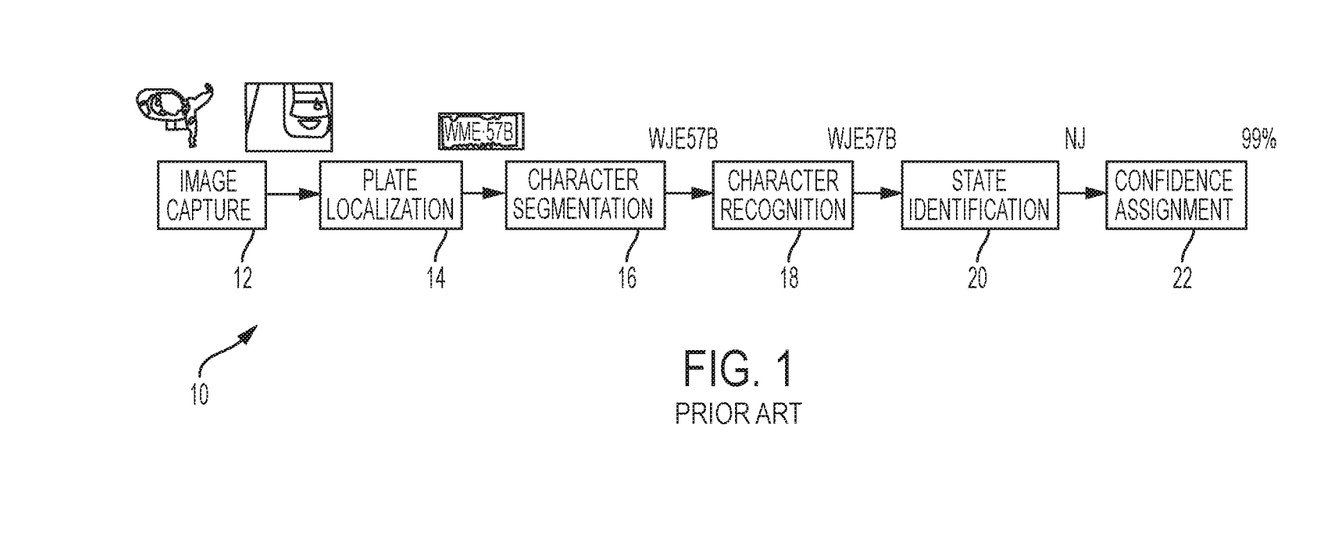
FIG. 1 illustrates a block diagram of a prior art ALPR (Automatic License Plate Recognition) system.

ALPR systems can be employed in a variety of traffic surveillance applications, including toll monitoring, parking management, and detection of different types of traffic violation. FIG. 1 illustrates a high level block diagram providing an overview of operations and components of a prior art ALPR system 10. ALPR systems such as the example prior art system 10 shown in FIG. 1 typically include four stages. In the first stage, as shown at block 12, an image of a vehicle can be captured while the vehicle is moving (e.g., passing a toll booth). In this image acquisition stage, near infrared cameras are typically utilized to capture vehicle images both day and night time under low lighting conditions. In the second stage, as shown at block 14, the captured vehicle image is processed to localize the license plate region in the image. Many different methods may be implemented for license plate localization. After localizing the plate region in the image, the characters are segmented and extracted in the third stage, as shown at block 16. In the final stage, the segmented character images are recognized, as depicted at block 18, utilizing an OCR (Optical Character Recognition) engine trained in an offline phase. Thereafter, as shown at block 20, an operation can be implemented to identify a state associated with the license plate. The OCR engine typically outputs a confidence score for each of the segmented character from which an overall confidence score is calculated for the entire plate. If the overall confidence score is higher than a pre-defined threshold, recognized license plate number are transmitted directly to the rest of the processing pipeline without human interruption as indicated at block 22. When the confidence score is less than the threshold, the license plate image first goes to manual human review process to avoid the serious public relations problem of issuing improper citations.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings and abstract as a whole.

It is, therefore, one aspect of the disclosed embodiments to provide for improved image classification methods, systems, and processor-readable media.

It is another aspect of the disclosed embodiments to provide for methods, systems, and processor-readable media for detecting and classifying license plates in captured images of vehicles.

The aforementioned aspects and other objectives and advantages can now be achieved as described herein. Methods, systems, and processor-readable media for the detection and classification of license plates are disclosed. In an example embodiment, an image of a vehicle can be captured with an image-capturing unit. A license plate region can then be located in the captured image of the vehicle by extracting a set of candidate regions from the image utilizing a weak classifier. A set of candidate regions can be ranked utilizing a secondary strong classifier. The captured image can then be classified according to a confidence driven classification based on classification criteria determined by the weak classifier and the secondary strong classifier. In an alternative example embodiment, the captured image can be classified according to a confidence driven classification to exclude the image from review based on classification criteria determined by the weak classifier and the secondary strong classifier.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term one or more as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 2:
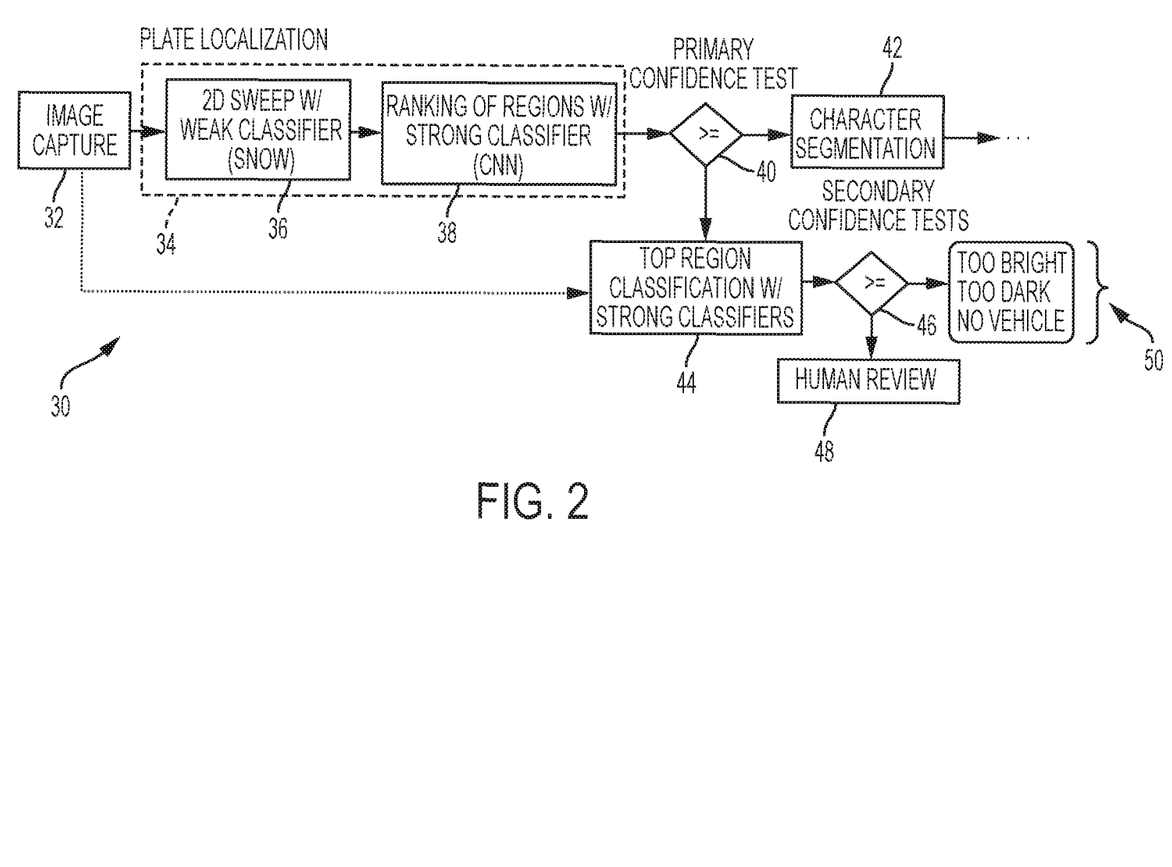
FIG. 2 illustrates a flow chart of operations depicting a method for the detection and classification of license plates, in accordance with an example embodiment.

FIG. 2 illustrates a flow chart of operations depicting a method 30 for the detection and classification of license plates, in accordance with an example embodiment. As shown at block 32, an image capture operation can be implemented. Output from this operation can be subject to a plate localization operation 34 (indicated by dashed lines) or to a top region classification operation, as depicted at block 44.

The plate localization operation 34 can be implemented, as indicated at block 36 and 38. As shown at block 36, a 2D (two dimensional) sweep operation with a weak classifier (e.g., a SNOW (Sparse Network of Winnows) classifier) can be processed. The output from this operation is subject to ranking of regions with a strong classifier (e.g., a CNN (Convolutional Neural Network)). A primary confidence test can then be implemented, as shown at decision block 40, followed by either a character segmentation operation, as indicated at block 42 or a top region classification operation with strong classifiers, as illustrated at block 44. Thereafter, a secondary confidence test can be implemented, as shown at decision block 46. The output from this operation can be subject to human review, as depicted at block 48 or a determination is provided that the resulting output data is too bright, too dark, and/or that no vehicle is present in the image.

The method 30 shown in FIG. 2 can thus implement license plate detection with image quality evaluation for minimizing human intervention in the loop and also providing an improved performance in challenging image acquisition conditions (e.g., over/under exposure, too dark, too bright, etc.).

Locating the license plate in the captured image involves a two-stage approach, where a set of candidate regions of interest (ROIs) are extracted using a weak (but fast) classifier (e.g., SNOW trained with SMQT (Successive Mean Quantization Transform) features) as shown at block 36 and scrutinized by a strong (but slower) classifier (e.g., CNN) in the second stage as depicted at block 38. The second stage ranks the ROIs by likelihood of license plate presence. The primary confidence test shown at block 40 involves comparing the confidence of the most likely ROI (Region of Interest) to a "plate is present" threshold. The operation shown at block 44 involves using a set of strong classifiers such as CNNs to identify the reason for failure to exceed the "plate is present" threshold. Typical classifiers are those trained to detect that a license plate is too bright, too dark, no plate installed, or no vehicle in ROI. This can be done to eliminate low quality/no-plate images from human review.

The image capture operation shown at block 32 involves the capture/acquisition of images from, for example, highways or express-ways using, for example, RGB cameras which are directed towards the license plate of an incoming vehicle. If night vision is desired, cameras with NIR capabilities coupled with an external illuminator can also be used in the context of the operation illustrated at block 32. In some embodiments, the images captured by red light enforcement cameras, other tolling cameras, speed detection cameras, or the like can be processed to implement the proposed ALPR system and operations described herein.

Figure 3:
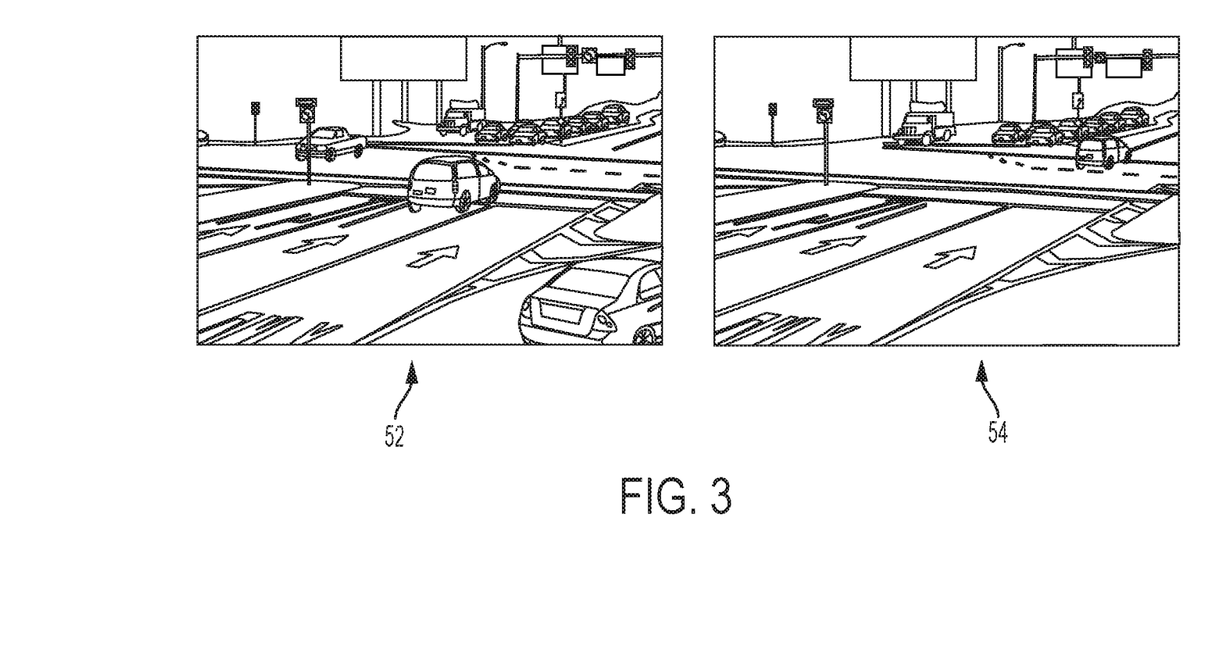
FIG. 3 illustrates sample images captured by a red light enforcement system, in accordance with an example embodiment.

FIG. 3 thus depicts sample images 52, 54 captured by a red light enforcement system, in accordance with an example embodiment. Image 52 constitutes a first evidentiary image (Shot A) and image 54 is a second evidentiary image (Shot B). When a violation is detected, the license plate of the violating vehicle is required to be located and identified for a fully automated system.

One of the key challenges for ALPR systems is the accurate localization of license plate on the captured image/video frame. The majority of the existing techniques for localization operate by first finding the busy areas on the image plane and then localizing the license plate by identifying the text regions on the detected busy areas. These techniques can accurately locate license plates in images captured in controlled settings, where the primary purpose of the camera is to capture the license plate of a vehicle (e.g., tolling). So, the camera is configured accordingly to capture the license plate of the vehicle clearly. There are also settings/applications where the automated license plate detection is only a secondary concern of the camera and hence, the camera is not configured for license plate detection (e.g., red light enforcement cameras as shown in FIG. 3 or automated parking billing). The license plate is required to be detected in cluttered scenes in these applications.

Hence, a two-stage license plate detection algorithm can be implemented, as shown at blocks 36 and 38, wherein a set of candidate regions are extracted using a weak classifier in the first stage and scrutinized by a strong (but slower) classifier (e.g., CNN) in the second stage. The reason for using a weak classifier to identify the candidate regions in the first stage is that weak classifiers are usually much faster. They have low rejection rates that often induce a higher number of false alarms, which are further eliminated by the strong classifier in the second stage. The weak classifier can include a SNOW classifier trained with SMQT features and the strong classifier can include a deep convolutional neural network trained/fine-tuned with license plate images. The SMQT features can be extracted at few scales given the camera geometry/configuration.

In one example embodiment, the selected weak classifier may be a SNOW classifier using SMQT features. In such an example embodiment, the template size may be 50×140 (rows, cols), which is the smallest size of license plates encountered in our image set. This is the baseline template size for the SNOW classifier. In this example embodiment, SNOW classifier can be swept across the input image using, for example, a [10 15] pixel offset. The template can be swept across the input image horizontally in steps of, for example, fifteen pixels and vertically in steps of ten pixels. For each evaluation, the resulting classifier score or confidence is recorded. Once the sweep is complete, ten regions of, for example, 50×140 pixels can be extracted. The sweep can be conducted at multiple scales with magnitudes of, for example, 1.0 and 0.7. For each scale, the input image is resized accordingly. The extraction of ten likely ROI candidates is done in an iterative manner. For each ROI, the template corresponding to the highest confidence score is extracted compensating for scale from the input image and the surrounding scores in the confidence matrix are nulled out. This ensures that subsequent region extractions have minimal overlap.

Figure 4:
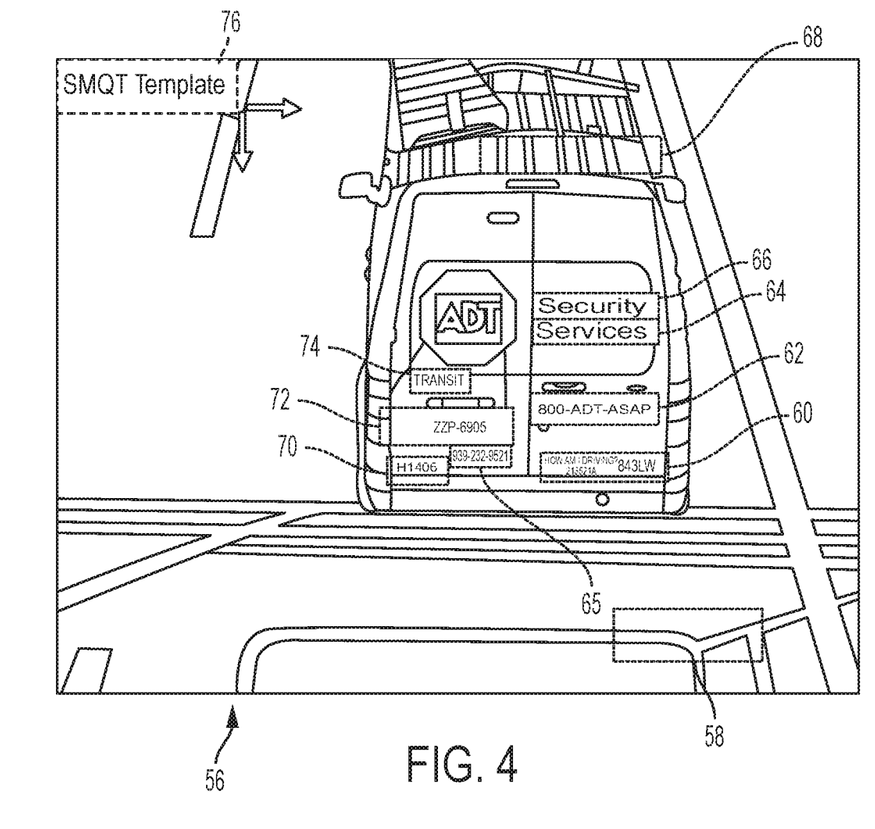
FIG. 4 illustrates a sample image depicting an example of a sweeping weak classifier and identified regions in accordance with an example embodiment.

FIG. 4 illustrates an example of the regions identified by the first stage 2D sweeping of the weak classifier. The sample image 56 shown in FIG. 4 depicts an example of a sweeping weak classifier and identified regions, in accordance with an example embodiment. For example, an SMQT template 76 is shown in the top left corner of image 56. Various ROIs are shown in image 56 at blocks 58, 60, 62, 64, 65, 66, 68, 70, 72, and 74.

The strong classifier is trained to discriminate between readable and unreadable license plate images. The readable image set includes all regions that contain a license plate, which can be recognized by a human, and in turn capable of being successfully processed with an ALPR engine. The unreadable set includes all regions for which a human cannot recognize the license plate code and/or state. This set would include cases where the license plate is not present, is partially occluded, is too dark, too bright, or mangled, etc. Our goal is to automatically identify and exclude the unreadable (non-revenue) imagery from human review.

In an example embodiment, each ROI image can be resized to 224×224 before passing to the CNN defined and trained and extracting the 4096 features of the layer before softmax. These features can be used as input to a linear SVM trained to differentiate between ROI's with plates and those without. Platt's method can be used to convert the SVM score to a posterior probability and this probability can then be employed as the confidence output of the second stage.

Figure 5:
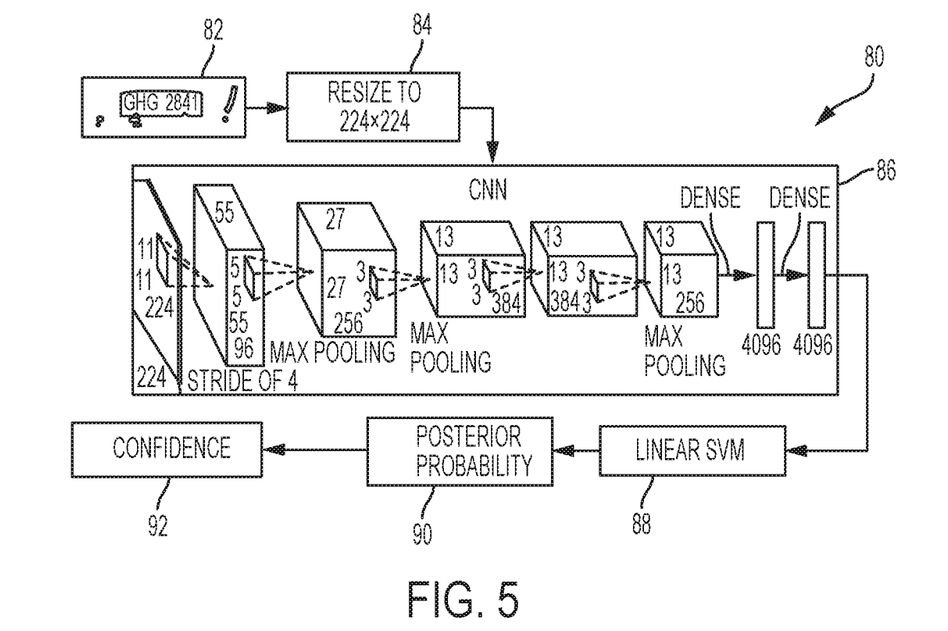
FIG. 5 illustrates illustrates a block diagram depicting a strong classifier applied to each ROI (Region of Interest) in an image, in accordance with an example embodiment.

FIG. 5 illustrates a block diagram depicting a strong classifier 80 applied to each ROI (Region of Interest) in a sample image 82, in accordance with an example embodiment. FIG. 5 depicts the process flow of the second stage for each ROI. As shown at block 84, the image 82 is resized and then subject to a CNN 86. Output from the CNN is sent to a linear SVM (Support Vector Machine) module 88. Output from the linear SVM module 88 can be processed by a posterior probability module 90 and the resulting confidence 92 generated.

Note that "SVM" (Support Vector Machine) is a machine learning supervised learning model with associated learning algorithms that together can analyze data for classification and/or regression analysis. Given a set of training examples, each marked for belonging to one of two categories, an SVM training algorithm can build a model that assigns new examples into one category or the other, making it a non-probabilistic binary linear classifier. An SVM model such as that implemented by SVM module 88 is a representation of the examples as points in space, mapped so that the examples of the separate categories are divided by a clear gap that is as wide as possible. New examples are then mapped into that same space and predicted to belong to a category based on which side of the gap they fall on. In addition to performing linear classification, SVMs can efficiently perform a non-linear classification using what is called the kernel trick, implicitly mapping their inputs into high-dimensional feature spaces.

Figure 6:
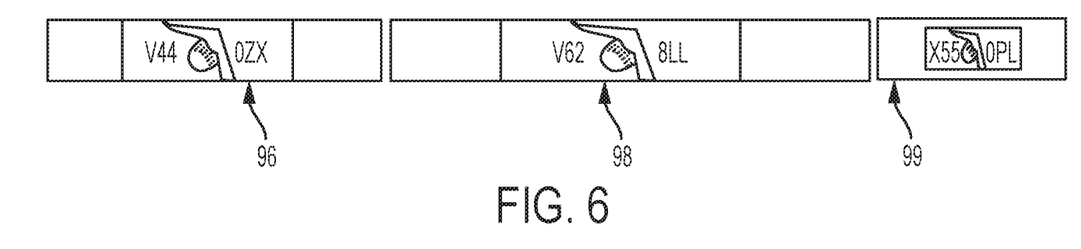
FIG. 6 illustrates sample localized plate region images in accordance with an example embodiment.

Note that the 2-stage architecture (e.g., see blocks 36 and 38 of FIG. 2) for license plate detection may seem to resemble an object detection algorithm referred to R-CNN, which also can first identify a set of candidate regions and applies CNN on each candidate region to detect objects in an image. R-CNN uses a generic classifier as a measure of "objectness" to identify candidate regions in an image. When this generic "objectness" classifier is applied to license plate images, it results in a very high miss rate as license plate structure is significantly different from typical objects' with closed boundaries and relatively smooth interior. A fundamental differentiation from R-CNN, however, is that the disclosed embodiments employ a weak classifier instead of a generic "objectness" classifier to find candidate LP regions in an image. The output of this module is the localized plate regions as shown in FIG. 6. That is, FIG. 6 illustrates sample localized plate region images 96, 98, 99, in accordance with an example embodiment.

Another significant drawback of the "objectness" classifier in R-CNN is the time involved to identify the candidates. On average, using a single CPU, the R-CNN proposer takes over 2 seconds per image. The 2D sweeping SNOW classifier discussed herein, however, is an order of magnitude faster at 0.2 seconds per image. This is important for real world applications such as ALPR where the solution needs to keep up with the flow of traffic.

The output of the plate localization operation 34 shown in FIG. 2 is a set of candidate regions of interest (ROI's) ranked by confidence. The highest confidence is compared against a threshold to determine if a plate exists. If the test is satisfied, as shown at block 40 in FIG. 2, the ROI is passed on to downstream algorithms such as character segmentation, OCR, etc.

Figure 7:
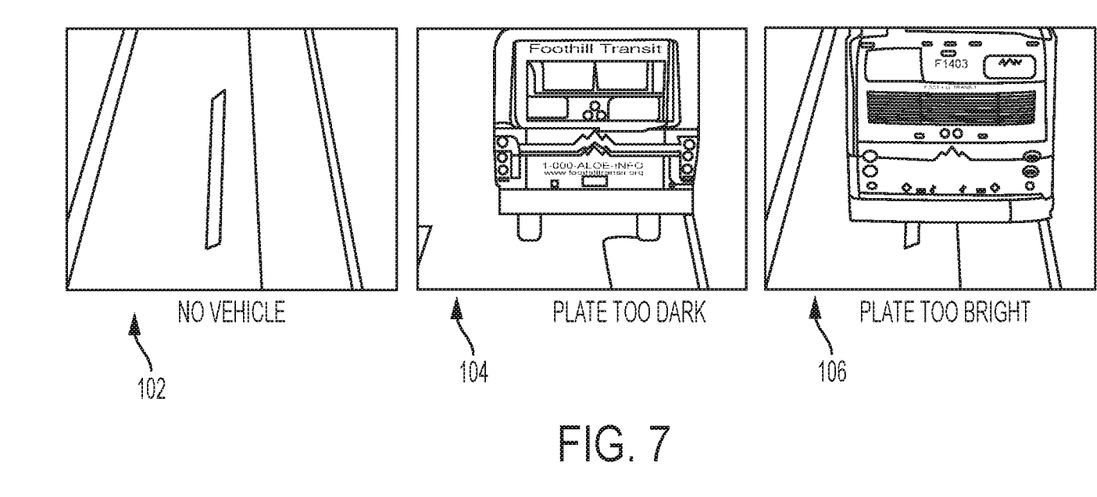
FIG. 7 illustrates sample images for three classes where a plate is not readable, in accordance with an example embodiment.

The top region classification operation shown in FIG. 2 with respect to block 44 can be implemented as a module, which is entered only when the primary confidence test fails. At this point, it is certain that no license plates exist in the image and that a determination should be made as to why. This module takes as input the originally captured image, resizes the original image to a standard template size such as 224×224 pixels, extracts CNN features, and classifies using these features. The classifier can be implemented as a softmax with three classes: too bright, too dark, no vehicle. The classifier can be trained on images for each class. Some examples are illustrated in FIG. 7. That is, FIG. 7 illustrates sample images 102, 104, 106 for three classes wherein a plate is not readable, in accordance with an example embodiment. That is, image 102 indicates that no vehicle is present. Image 104 indicates that the license plate on the vehicle shown in the image is too dark and therefore not readable. In image 186, the license plate is too bright and thus is not readable.

Turning now to the secondary confidence test depicted at decision block 46, the output from this step or operation is a probability for each of the three classes. Each class has a unique probability threshold that is tested to determine whether the original image should be classified as having a particular problem. The class with the highest margin above its threshold is the winner. If no classes have confidence exceeding their threshold, then the image is sent to human review as shown at block 48 in FIG. 2.

The thresholds for each class can be determined during a classifier validation phase, which is offline and follows classifier training. During validation, we intend to pick a threshold such that the FPR (False Positive Rate) of the classifier is less than or equal to 0.5%. An FPR of 0.5% has been suggested as an acceptable error rate, hut is not considered a limiting feature of the disclosed embodiments. An important goal is to maximize the true positive rate (TPR) at the FPR set point of 0.5%, for example, and an operation then implemented to select as the confidence threshold, the set point that maximizes TPR.

Figure 8:
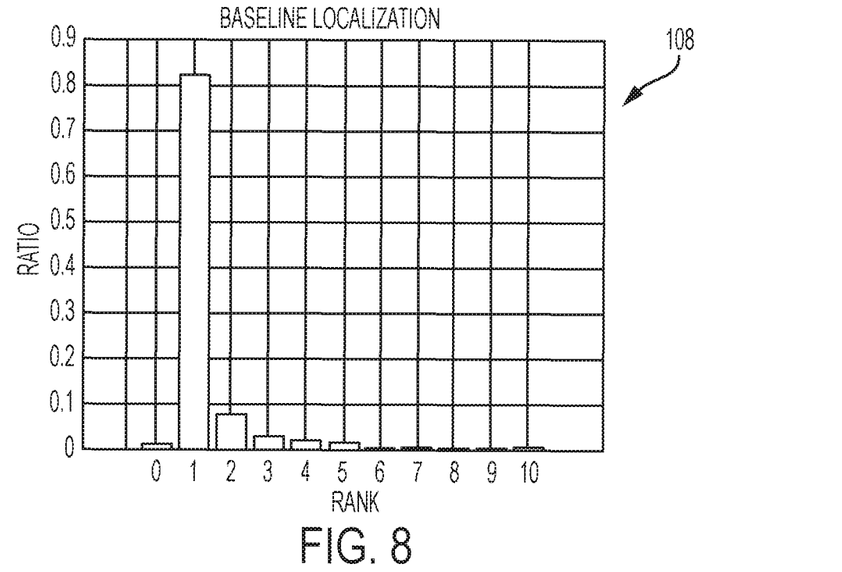
FIG. 8 illustrates a graph depicting the rank of a plate containing region using baseline localization, in accordance with an example embodiment.
Figure 9:
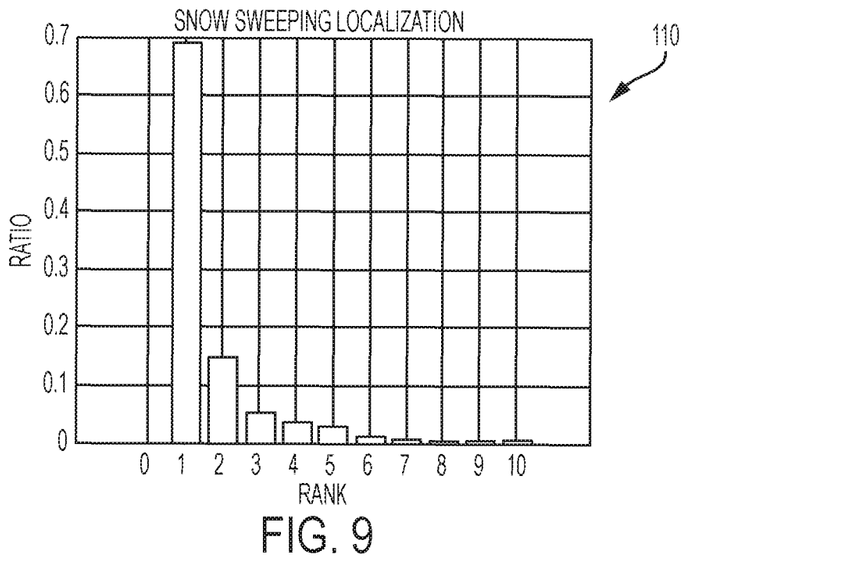
FIG. 9 illustrates a graph depicting the rank of a plate containing region using 2D SNOW (Sparse Network of Winnows) localization, in accordance with an example embodiment.
Figure 10:
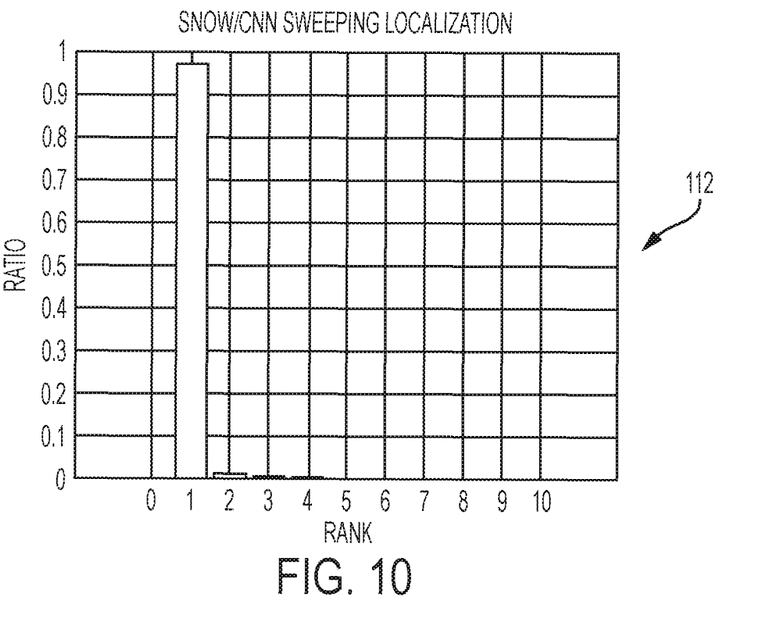
FIG. 10 illustrates a graph depicting the rank of a plate containing region using the disclosed localization approach, in accordance with an example embodiment.

FIGS. 8, 9, and 10 illustrate the results of experiments conducted using real world data to test the performance of each module in the disclosed ALPR system. For example, the 2-stage localization aspect of method 30 discussed herein with respect to blocks 36 and 38 in FIG. 2 was tested on an NC (North Carolina) image set. In this experimental embodiment, each plate localization method was configured to return 10 candidate ROIs for an input image. Each captured image contained only one plate and the rank of the plate containing the ROI was recorded for each test image. The frequency of the ranking is plotted in FIGS. 8-10 for three localization approaches.

FIG. 8 illustrates a graph 108 depicting the rank of a plate containing region using baseline localization, in accordance with an example embodiment. FIG. 8 shows the performance of baseline algorithms. FIG. 9 illustrates a graph 110 depicting the rank of a plate containing region using 2D SNOW localization, in accordance with an example embodiment. FIG. 9 depicts the performance of the first stage alone where the ranking is done by the confidence of the SNOW classifier. FIG. 10 illustrates a graph 112 depicting the rank of a plate containing region using the disclosed localization approach, in accordance with an example embodiment. FIG. 10 shows the performance of the 2-stage approach where the SNOW classifier is used to identify the ROI's and the CNN classifier is used to rank them.

For the baseline approach in FIG. 8, it can be seen that 83% of the time the top ROI contains a license plate, 8% of the time the second ROI contains the license, and so on. The average ranking for the three methods is 1.43, 1.74, and 1.11, respectively. It is important to have a low average rank as that ensures faster real time processing of captured imagery. If the plate is ranked incorrectly, many non-plate containing regions need to be processed before a result is returned. If a plate is found a high enough confidence is returned, the processing of subsequent regions can be safely aborted.

Figure 11:
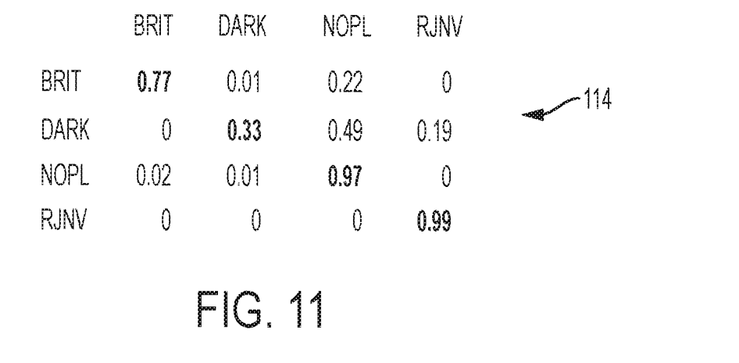
FIG. 11 illustrates a confusion matrix depicting TPR results of image classification, in accordance with an example embodiment.

To test the performance of the image classification portion of the disclosed embodiments, images from CA (California) were used since these contain human labeled ground truth data categorized by the classes of interest. FIG. 11 illustrates a confusion matrix 114 depicting TPR results of image classification, in accordance with an example embodiment. FIG. 11 shows the classification performance at FPR of 0.5%. Overall, the performance is positive on the "no plate" and "no vehicle" classes (>90%), while there is some confusion among the "too bright" and "too dark" classes (77% and 32%, respectively). It is worth noting that in the latter case, both of these classes are often confused for the "no plate" class. One explanation for this confusion is that there is a lack of high frequency information being recovered at the plate area in all three classes (i.e., strong shadows and/or over-exposure results in a flat, uniform texture at the plate region, as can be seen in FIG. 7).

Figure 12:
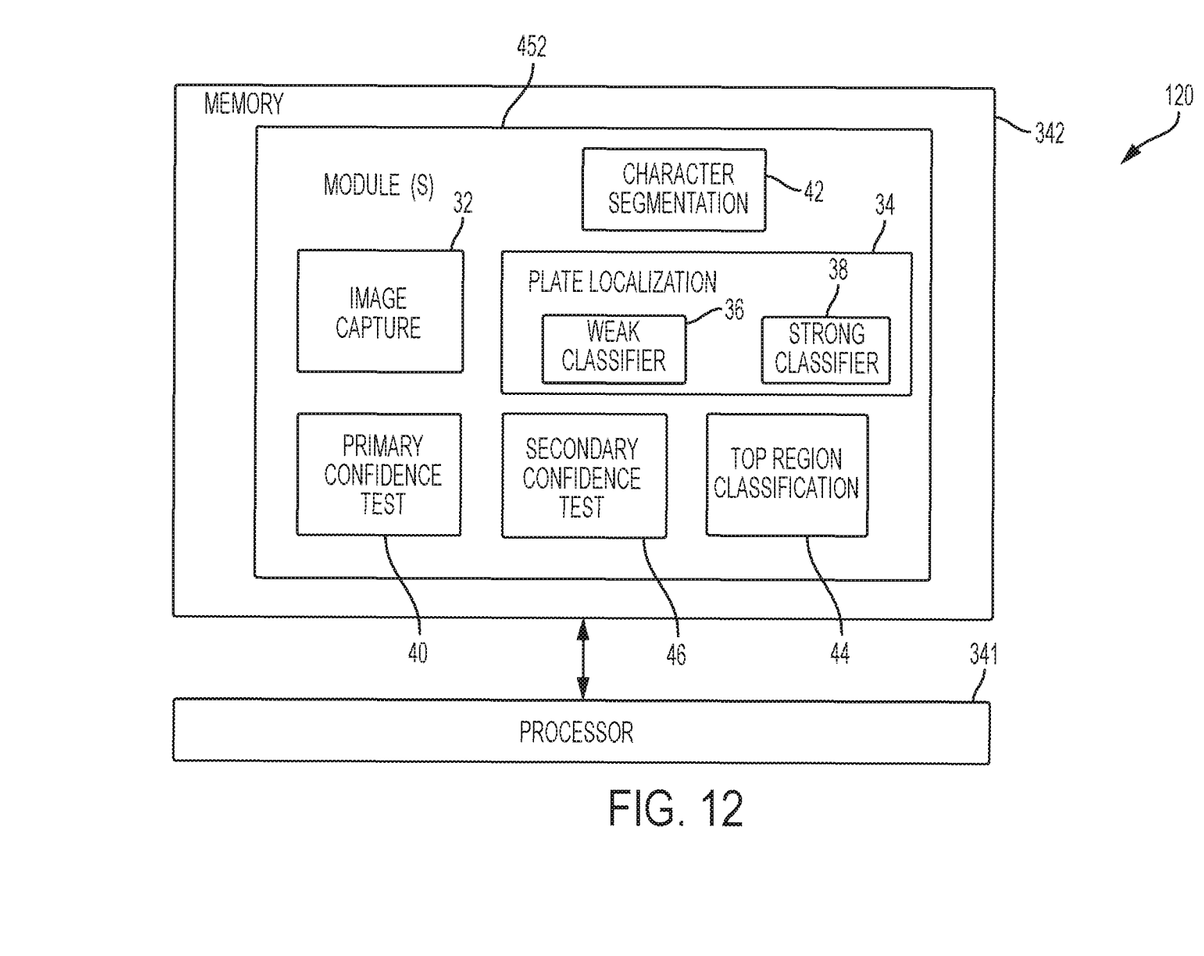
FIG. 12 illustrates a block diagram of a system for the detection and classification of license plates, in accordance with an example embodiment.

FIG. 12 illustrates a block diagram of a system 120 for the detection and classification of license plates, in accordance with an example embodiment. The system 120 shown in FIG. 12 includes a memory 342 that communicates bidirectionally and electronically with a processor 341. The memory 342 stores a module 452 (or a group of modules) composed of, for example, an image capture module 32, a plate localization module 34, a primary confidence testing module 40, a secondary confidence testing, module 46, a top region classification module 44, and a characterization module 42. The plate localization module 34 includes a weak classifier module 36 and a strong classifier module 38. Note that such modules include instructions that implement the various operational steps discussed herein with respect to the method 30 shown in FIG. 2. For example, the image capture module 32 depicted in FIG. 12 implements the instructions associated with the image capture block 32 shown in FIG. 2, the plate localization module 34 illustrated in FIG. 12 implements the instructions associated with the plate localization operations 34 shown in FIG. 2, and so on.

The image capture module 32 thus includes instructions for capturing an image, such as that of a vehicle. Such instructions can direct, for example, the operations of an image-capturing unit (e.g., an ALPR camera) such as the image capturing unit 332 discussed herein with respect to FIG. 13. The license plate localization module 34 can include instructions for locating a license plate in the captured image using the two-stage approach described previously, where a set of candidate regions of interest (ROIs) are extracted using a weak (but fast) classifier 36 (e.g., SNOW trained with SMQT features) and scrutinized by a strong (but slower) classifier 38 (e.g., CNN) in the second stage. As also indicated previously, the second stage ranks the ROIs by likelihood of license plate presence. The primary confidence test module 40 implements the primary confidence test discussed previously. That is, the primary confidence module 40 generates a set of candidate regions of interest (ROI's) ranked by confidence. The highest confidence is compared against a threshold to determine if a plate exists. If the test is satisfied, the ROI is passed on to downstream modules such as the character segmentation module 42, which includes instructions for character segmentation.

The secondary confidence test module 46 generates a probability for each of the three classes, as discussed previously. That is, each class has a unique probability threshold that is tested to determine whether the original image should be classified as having a particular problem. The class with the highest margin above its threshold is the winner. If no classes have confidence exceeding their threshold, then the image is sent to human review. The thresholds for each class are determined during the classifier validation phase, which is offline and generally follows classifier training. The top region classifier module 44 is entered only when the primary confidence test performed by the primary confidence test module 40 fails.

Note that in some embodiments, computer program code for carrying out operations of the disclosed embodiments may be written in an object oriented programming language (e.g., Java, C#, C++, etc.). Such computer program code, however, for carrying out operations of particular embodiments can also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wimax, IEEE 802.xx, and cellular network, or the connection may be made to an external computer via most third party supported networks (e.g., through the Internet via an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer, program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 13:
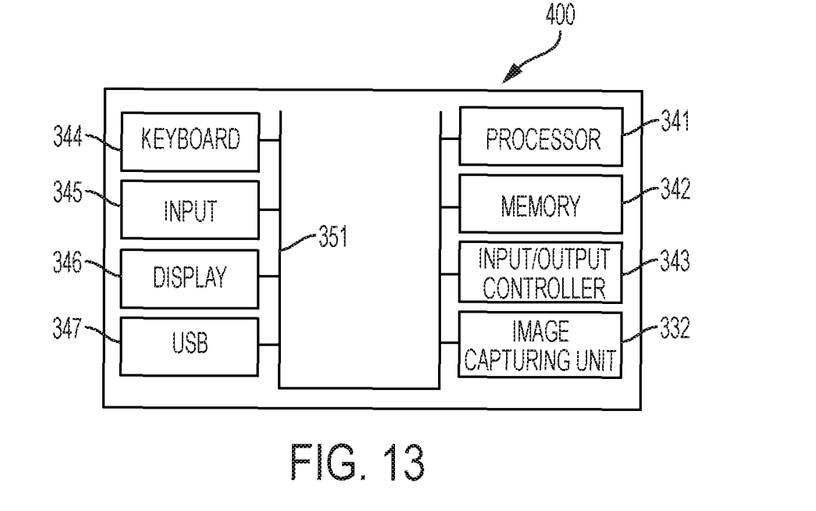
FIG. 13 illustrates a schematic view of a software system including a module, an operating system, and a user interface, in accordance with an example embodiment.
Figure 14:
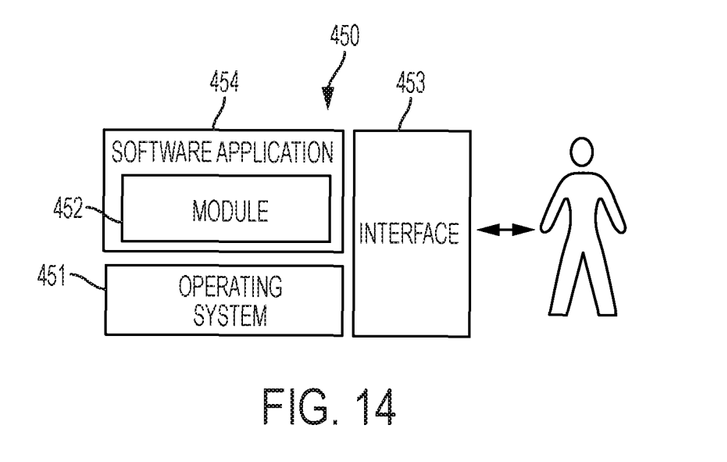
FIG. 14 illustrates a system for target domain characterization for data augmentation, which can be implemented in accordance with an example embodiment.

FIGS. 13-14 are provided as exemplary diagrams of data-processing environments in which embodiments may be implemented. It should be appreciated that FIGS. 13-14 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 13, some embodiments may be implemented in the context of a data-processing system 400 that can include one or more processors such as processor 341, a memory 342, a controller 343 (e.g., an input/output controller), a peripheral USB (Universal Serial Bus) connection 347, a keyboard 344 (e.g., a physical keyboard or a touch screen graphically displayed keyboard), an input component 345 (e.g., a pointing device, such as a mouse, track ball, pen device, which may be utilized in association or with the keyboard 344, etc.), a display 346, and in some cases, an image-capturing unit 332 (e.g., a digital video camera, an ALPR camera, etc.). Data-processing system 400 may be, for example, a client computing device (e.g., a client PC, laptop, tablet computing device, etc.), which communicates with peripheral devices (not shown) via a client-server network (e.g., wireless and/or wired). In another embodiment, the data-processing system may be a server in the context of a client-server network or other server-based network implementation.

As illustrated, the various components of data-processing system 400 can communicate electronically through a system bus 351 or other similar architecture. The system bus 351 may be, for example, a subsystem that transfers data between, for example, computer components within data-processing system 400 or to and from other data-processing devices, components, computers, etc. Data-processing system 400 may be implemented as, for example, a server in a client-server based network (e.g., the Internet) or can be implemented in the context of a client and a server (i.e., where aspects are practiced on the client and the server). Data-processing system 400 may be, for example, a stand-alone desktop computer, a laptop computer, a Smartphone, a pad computing device, a server, and so on.

FIG. 14 illustrates a computer software system 450 for directing the operation of the data-processing system 400 shown in FIG. 13. Software application 454, stored for example in memory 342, generally includes a kernel or operating system 451 and a shell or interface 453. One or more application programs, such as software application 454, may be "loaded" (i.e., transferred from, for example, memory 342 or another memory location) for execution by the data-processing system 400. The data-processing system 400 can receive user commands and data through the interface 453; these inputs may then be acted upon by the data-processing system 400 in accordance with instructions from operating system 451 and/or software application 454. The interface 453, in some embodiments, can serve to display results, whereupon a user may supply additional inputs or terminate a session.

The software application 454 can include one or more modules such as, for example, a module 452 (or a module composed of a group of modules), which can, for example, implement instructions or operations such as those described herein. Examples of instructions that can be implemented by module 452 include steps or operations such as those shown and described herein with respect to the various blocks and operations shown in FIG. 2 and described elsewhere herein. Module 452 can include sub-modules such as, for example, the various modules shown in FIG. 12.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" such as module 452 shown in FIG. 14 constitutes a software application. However, a module may also be composed of, for example, electronic and/or computer hardware or such hardware in combination with software. In some cases, a "module" can also constitute a database and/or electronic hardware and software that interact with such a database. For example, the image capture module 32 shown in FIG. 12 may include or direct the operations of the image-capturing unit 332 depicted in FIG. 13.

Generally, program modules include, but are not limited to, routines, subroutines, software, applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can refer to a collection of routines and data structures that perform a particular task or implement a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. Thus, the instructions or steps such as those shown in FIG. 2, for example, and discussed elsewhere herein can be implemented in the context of such a module or modules, sub-modules, and so on. Examples of such modules are also shown in FIG. 12.

FIGS. 13-14 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including, for example, Windows, Macintosh, UNIX, LINUX, and the like.

Based on the foregoing, it can be appreciated that a number of example embodiments, preferred and alternative, are disclosed herein. For example, in one embodiment, a method for the detection and classification of license plates can be implemented. Such a method may include the steps or operations of locating a license plate region in an image of a vehicle by extracting a set of candidate regions from said image utilizing a weak classifier; ranking said set of candidate regions utilizing a secondary strong classifier; and classifying said image according to a confidence driven classification based on classification criteria determined by said weak classifier and said secondary strong classifier.

In another example embodiment, the step or operation of classifying said image according to a confidence driven classification based on classification criteria determined by said weak classifier and said secondary strong classifier can further involve a step or operation of classifying said image according to a confidence driven classification to exclude said image from review based on classification criteria determined by said weak classifier and said secondary strong classifier.

In an another example embodiment, a method can be implemented for the detection and classification of license plates. Such an example method can include steps or operations such as capturing an image of a vehicle with an image-capturing unit; locating a license plate region in the image by extracting a set of candidate regions from the image utilizing a weak classifier; ranking the set of candidate regions utilizing a secondary strong classifier; and classifying the captured image according to a confidence driven classification to exclude the image from review based on classification criteria determined by the weak classifier and the secondary strong classifier.

In some example embodiments, the weak classifier can be implemented as a fast classifier. In another example embodiment, the weak classifier may be a SNOW classifier. In yet another example embodiment, the secondary strong classifier may be a slow classifier. In yet another example embodiment, the secondary strong classifier may be a neural network. Still, in other example embodiments, such a neural network can be implemented as a CNN (Convolutional Neural network).

In some example embodiments, the classification criteria with respect to the image can include classification data indicative of one or more of the following: a license plate not present in the image; a license plate in the image is too bright; a license plate in the image is too dark; a vehicle in the image is not found; a license plate in the image is too blurry; a license plate in the image is obstructed; or a license plate is present and readable. Regarding the last category of a "license plate is present and readable," in effect, if a license plate is present, then automatic processing may occur and a conclusion returned. If not, then a conclusion can be reached that one of the other categories above to remove from review. If none of those apply, then the image is sent to human review.

It can be appreciated, of course, that such listed classification data is exemplary only and is not considered a limiting feature of the disclosed embodiments. Other types of classification data can also be utilized in accordance with other example embodiments.

In yet another example embodiment, a system for the detection and classification of license plates can be implemented. Such a system can include, for example, at least one processor; and a computer-usable medium embodying computer program code, the computer-usable medium capable of communicating with the at least one processor. The aforementioned computer program code can include instructions executable by the at least one processor and configured, for example, for: capturing an image of a vehicle with an image-capturing unit; locating a license plate region in the image by extracting a set of candidate regions from the image utilizing a weak classifier; ranking the set of candidate regions utilizing a secondary strong classifier; and classifying the captured image according to a confidence driven classification to exclude the image from review based on classification criteria determined by the weak classifier and the secondary strong classifier.

In yet another example embodiment, a non-transitory processor-readable medium storing computer code representing instructions to cause a process for detecting and classifying license plates can be implemented. Such computer code can include code to, for example: capture an image of a vehicle with an image-capturing unit; locate a license plate region in the image by extracting a set of candidate regions from the image utilizing a weak classifier; rank the set of candidate regions utilizing a secondary strong classifier; and classify the captured image according to a confidence driven classification to exclude the image from review based on classification criteria determined by the weak classifier and the secondary strong classifier.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for the detection and classification via an image processor of license plates displayed in images captured by an image-capturing unit, said method comprising:
   capturing an image of a vehicle utilizing an image-capturing unit that communicates with an image processor;
   locating a license plate region in said image of said vehicle after capturing said image with said image-capturing unit by extracting a set of candidate regions from said image utilizing a weak classifier of said image processor;
   ranking said set of candidate regions utilizing a secondary strong classifier of said image processor; and
   classifying said image according to a confidence driven classification based on classification criteria determined by said weak classifier and said secondary strong classifier, thereby automatically identifying and eliminating un-readable images from human review.

2. The method of claim 1 wherein said weak classifier comprises a fast classifier.

3. The method of claim 1 wherein said secondary strong classifier comprises a slow classifier.

4. The method of claim 1 wherein said secondary strong classifier comprises a neural network.

5. The method of claim 4 wherein said neural network comprises a CNN (Convolutional Neural network).

6. The method of claim 1 wherein classifying said image according to a confidence driven classification based on classification criteria determined by said weak classifier and said secondary strong classifier, further comprises:
   classifying said image according to a confidence driven classification to exclude said image from review based on classification criteria determined by said weak classifier and said secondary strong classifier.

7. The method of claim 1 wherein said classification criteria with respect to said image comprises classification data indicative of at least one of the following:
   a license plate not present in said image;
   a license plate in said image is too bright;
   a license plate in said image is too dark;
   a vehicle in said image is not found;
   a license plate in said image is too blurry;
   a license plate in said image is obstructed; or
   a license plate is present and readable.

8. A system for the detection and classification via an image processor of license plates displayed in images captured by an image-capturing unit, said system comprising:
   an image processor; and
   a computer-usable medium embodying computer program code, said computer-usable medium capable of communicating with said at least one processor, said computer program code comprising instructions executable by said image processor and configured for:
      capturing an image of a vehicle utilizing an image-capturing unit that communicates with an image processor;
      locating a license plate region in said image of said vehicle after capturing said image with said image-capturing unit by extracting a set of candidate regions from said image utilizing a weak classifier of said image processor;
      ranking said set of candidate regions utilizing a secondary strong classifier of said image processor; and
      classifying said image according to a confidence driven classification based on classification criteria determined by said weak classifier and said secondary strong classifier, thereby automatically identifying and eliminating un-readable images from human review.

9. The system of claim 8 wherein said weak classifier comprises a fast classifier.

10. The system of claim 8 wherein said secondary strong classifier comprises a slow classifier.

11. The system of claim 8 wherein said secondary strong classifier comprises a neural network.

12. The system of claim 11 wherein said neural network comprises a CNN (Convolutional Neural network).

13. The system of claim 8 wherein said instructions for classifying said image according to a confidence driven classification based on classification criteria determined by said weak classifier and said secondary strong classifier, further comprises instructions configured for:
   classifying said image according to a confidence driven classification to exclude said image from review based on classification criteria determined by said weak classifier and said secondary strong classifier.

14. The system of claim 9 wherein said classification criteria with respect to said image comprises classification data indicative of at least one of the following:
   a license plate not present in said image;
   a license plate in said image is too bright;
   a license plate in said image is too dark;
   a vehicle in said image is not found;
   a license plate in said image is too blurry;
   a license plate in said image is obstructed; or
   a license plate is present and readable.

15. A non-transitory processor-readable medium storing computer code representing instructions to cause a process for detecting and classifying via an image processor license plates displayed in images captured by an image capturing unit, said computer code comprising code to:
   capture an image of a vehicle utilizing an image-capturing unit that communicates with an image processor;
   locate a license plate region in said image of said vehicle after said capture of said image with said image-capturing unit by extracting a set of candidate regions from said image utilizing a weak classifier of said image processor;

rank said set of candidate regions utilizing a secondary strong classifier of said image processor; and classify said image according to a confidence driven classification based on classification criteria determined by said weak classifier and said secondary strong classifier, thereby automatically identifying and eliminating un-readable images from human review.

16. The processor-readable medium of claim 15 wherein said weak classifier comprises a fast classifier.

17. The processor-readable medium of claim 15 wherein said secondary strong classifier comprises a slow classifier.

18. The processor-readable medium of claim 15 wherein said secondary strong classifier comprises a neural network.

19. The processor-readable medium of claim 15 wherein said code to classify said image according to a confidence driven classification based on classification criteria determined by said weak classifier and said secondary strong classifier, further comprises code to:

classify said image according to a confidence driven classification to exclude said image from review based on classification criteria determined by said weak classifier and said secondary strong classifier.

20. The processor-readable medium of claim 15 wherein said classification criteria with respect to said image comprises classification data indicative of at least one of the following:

a license plate not present in said image;

a license plate in said image is too bright;

a license plate in said image is too dark;

a vehicle in said image is not found;

a license plate in said image is too blurry;

a license plate in said image is obstructed; or a license plate is present and readable.

* * * * *